(12) United States Patent
Wilcox et al.

(10) Patent No.: US 6,953,203 B2
(45) Date of Patent: Oct. 11, 2005

(54) HUMAN POWERED VEHICLE

(75) Inventors: Rolland Wilcox, Colorado Springs, CO (US); Christopher Knapp, Colorado Springs, CO (US)

(73) Assignee: BW Designs, LLC, Colorado Springs, CO (US)

( * ) Notice: Subject to any disclaimer, the term of this patent is extended or adjusted under 35 U.S.C. 154(b) by 0 days.

(21) Appl. No.: 10/981,014

(22) Filed: Nov. 3, 2004

(65) Prior Publication Data

US 2005/0093270 A1 May 5, 2005

Related U.S. Application Data

(60) Provisional application No. 60/517,134, filed on Nov. 3, 2003.

(51) Int. Cl.[7] .............................................. B62D 61/06
(52) U.S. Cl. ........................ 280/282; 280/62; 280/287
(58) Field of Search ................................. 280/282, 287, 280/278, 267, 62

(56) References Cited

U.S. PATENT DOCUMENTS

| | | | |
|---|---|---|---|
| 450,001 A | 4/1891 | Carter | |
| 1,404,274 A | 1/1922 | Cooper | |
| 3,429,584 A | * 2/1969 | Hendricks | 280/261 |
| 3,447,623 A | 6/1969 | Hott | 180/25 |
| 3,485,509 A | 12/1969 | Searle | 280/243 |
| 3,746,118 A | 7/1973 | Altorfer | 180/25 |
| 3,836,177 A | 9/1974 | Heidt | 280/269 |
| 3,958,814 A | 5/1976 | Smith | 280/269 |
| 4,020,914 A | 5/1977 | Trautwein | 180/25 |
| 4,239,248 A | * 12/1980 | Ewers | 280/42 |
| 4,360,224 A | 11/1982 | Sato et al. | 280/772 |
| 4,469,344 A | * 9/1984 | Coil | 280/269 |
| 4,740,004 A | * 4/1988 | McMullen | 280/269 |
| 4,799,704 A | * 1/1989 | Colarusso | 280/267 |
| 4,863,183 A | * 9/1989 | Hwang et al. | 280/267 |
| 4,966,381 A | 10/1990 | Feikema | 280/261 |
| D338,433 S | 8/1993 | Crooks, Sr. | D12/112 |
| 5,727,801 A | 3/1998 | Barney et al. | 280/231 |
| 5,762,351 A | * 6/1998 | SooHoo | 280/267 |
| 5,863,058 A | 1/1999 | Jinks | 280/202 |
| D425,827 S | 5/2000 | Robinson | D12/112 |
| 6,367,824 B1 | * 4/2002 | Hayashi | 280/62 |
| 6,520,525 B1 | 2/2003 | Yoon | 280/278 |
| 6,764,089 B2 | * 7/2004 | Drymalski | 280/246 |
| 6,817,617 B2 | * 11/2004 | Hayashi | 280/5.509 |

* cited by examiner

*Primary Examiner*—Tony Winner
(74) *Attorney, Agent, or Firm*—Sheridan Ross P.C.

(57) ABSTRACT

A stable vehicle that can be folded or disassembled, for example for transportation by another vehicle or for storage, without requiring the use of hand tools. Two front wheels carried by steerable forks, in combination with an underslung main frame, provide a stable configuration. When folded or disassembled, the vehicle is compact, and can be transported using car mounted racks designed for conventional bicycles.

19 Claims, 12 Drawing Sheets

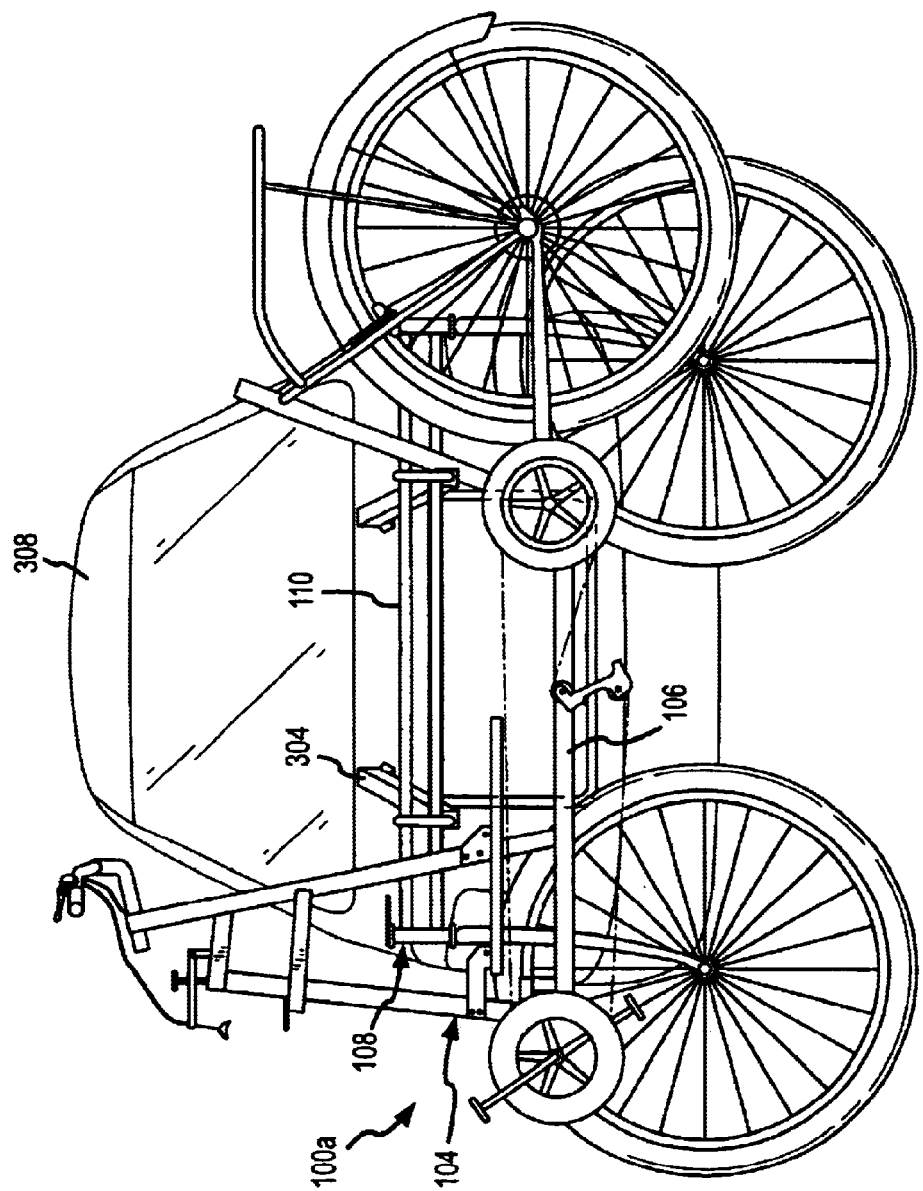

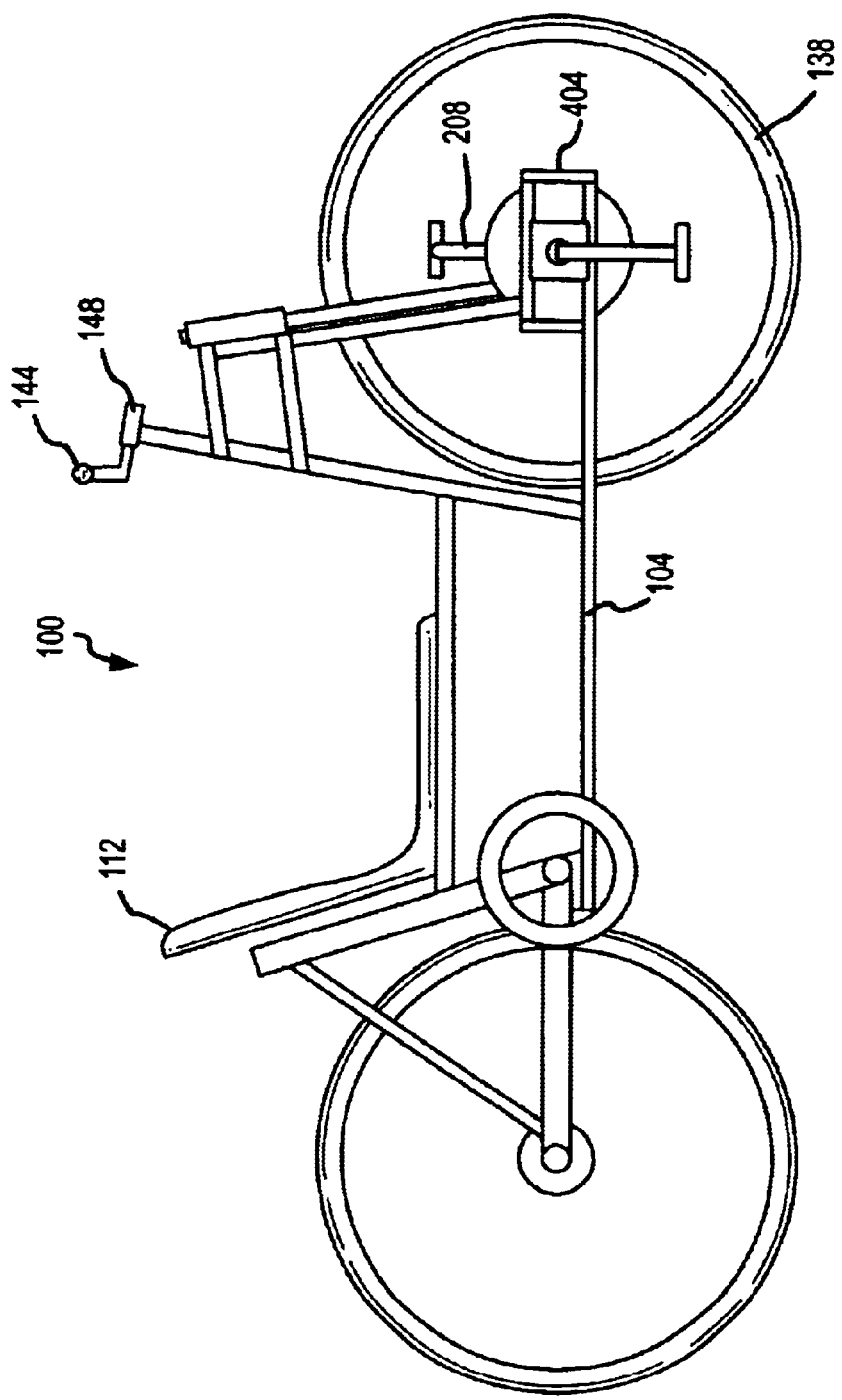

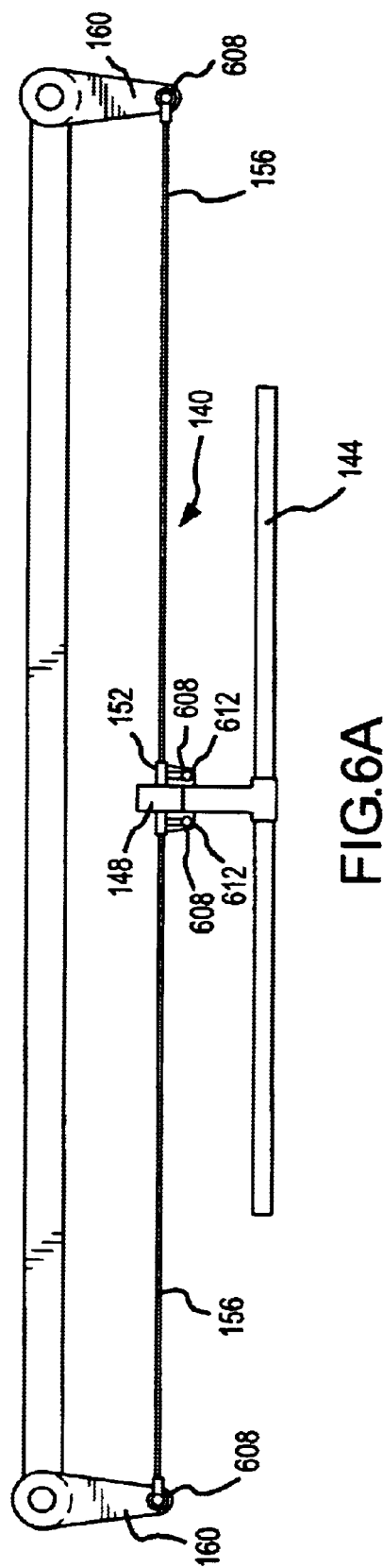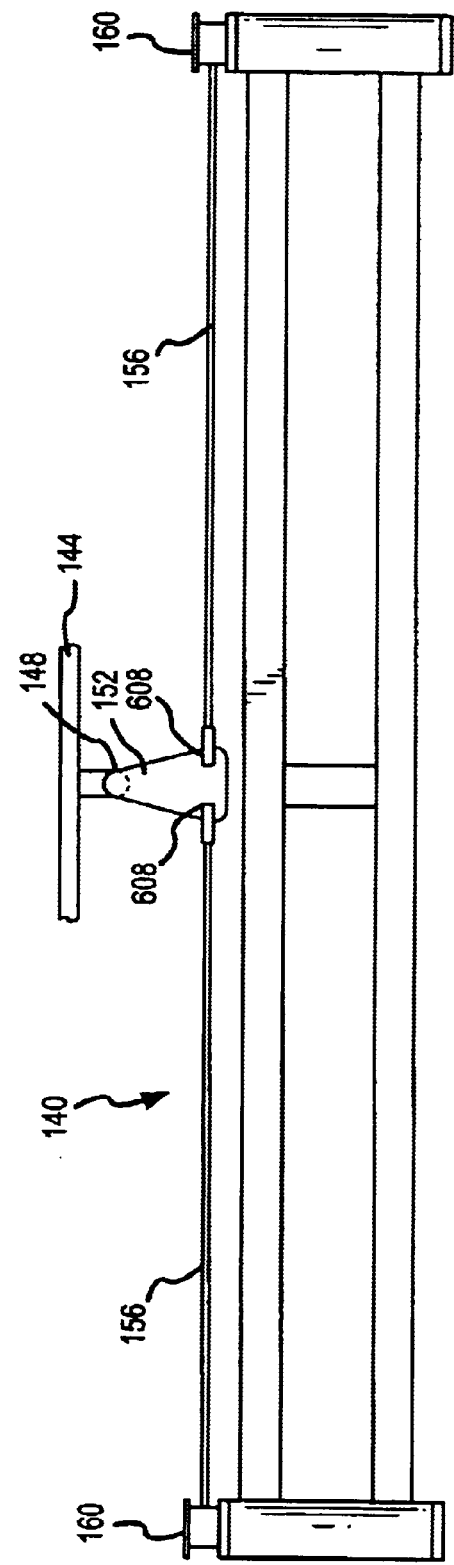

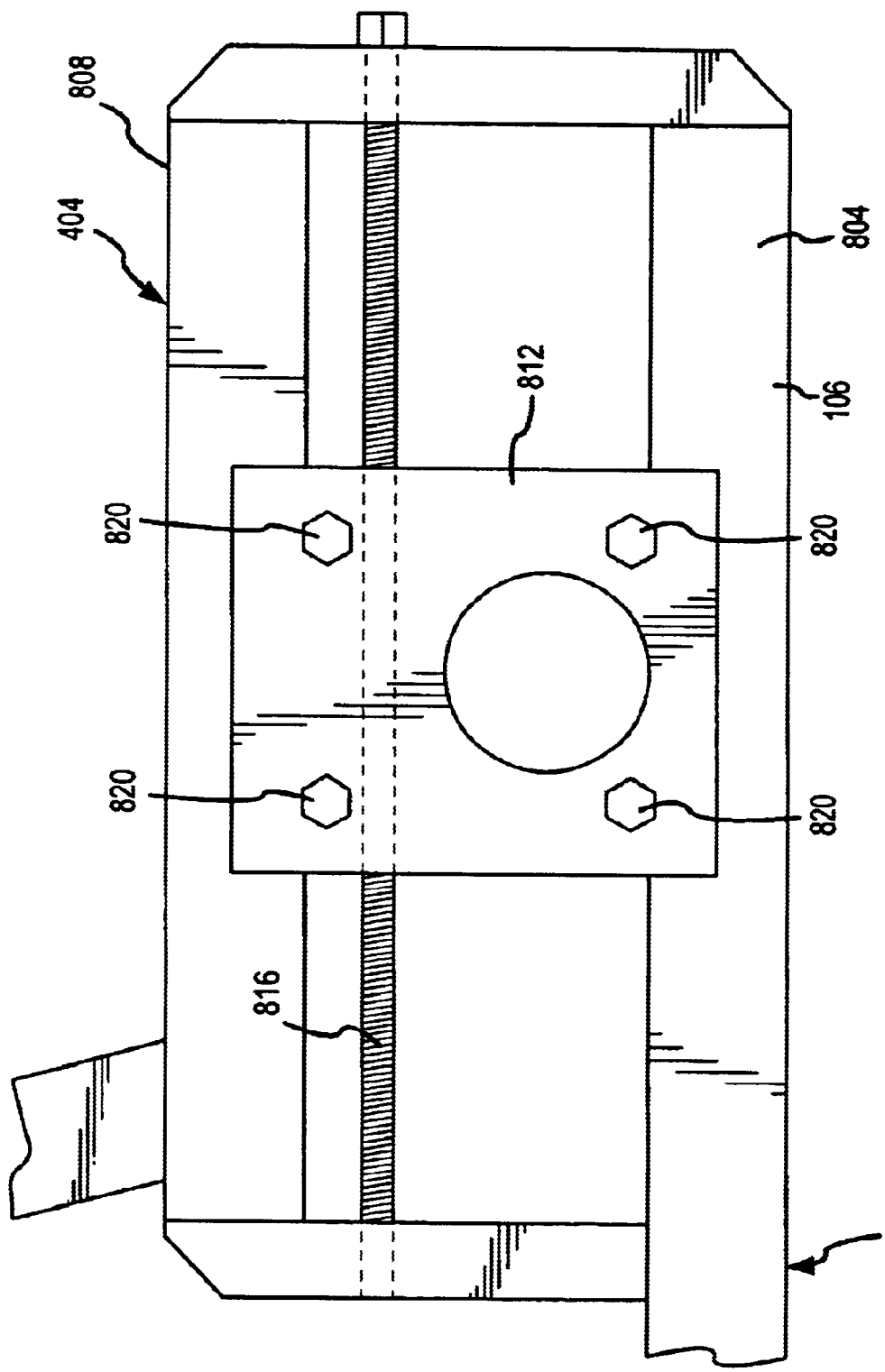

HUMAN POWERED VEHICLE

CROSS REFERENCE TO RELATED APPLICATIONS

This application claims the benefit of U.S. Provisional Application No. 60/517,134, filed Nov. 3, 2003, the entire disclosure of which is hereby incorporated herein by reference.

FIELD OF THE INVENTION

The present invention is related to human powered vehicles. In particular, the present invention is directed to a stable vehicle that can be disassembled for transport by another vehicle.

BACKGROUND OF THE INVENTION

Human powered vehicles, such as bicycles, are popular as a means of transportation and recreation. However, bicycles can be difficult or impossible to ride for persons having difficulty with balance or motor control. Tricycles, including tricycles for adult riders, can provide a usable alternative to bicycles for such persons.

Conventional adult tricycles often feature a single front wheel in combination with two rear wheels. However, such designs can be unstable during cornering or other maneuvers. Designs using two front wheels in combination with a single rear wheel have been developed. However, such designs have typically consisted of modifications to conventional bicycles. Accordingly, such designs have suffered from a high center of gravity.

In addition to having limitations in handling and stability, conventional adult tricycles have been difficult to transport and store. For example, adult tricycles have not been easily transportable using conventional racks for mounting bicycles to a car.

SUMMARY OF THE INVENTION

In accordance with embodiments of the present invention, a vehicle with three or more wheels and having a relatively low center of gravity is provided. In particular, the rider is placed in a recumbent or semi-recumbent position. Furthermore, the front frame is interconnected to the main frame at a main frame riser, such that a longitudinal member of the main frame is relatively close to the ground. This allows the front wheels to be interconnected to the front frame using conventional bicycle forks, while maintaining a low center of gravity.

In accordance with embodiments of the present invention, a tricycle having two front wheels and a single rear wheel is provided. The frame may provide two separable assemblies: a main frame and a front frame. In accordance with other embodiments of the present invention, the front frame is hinged with respect to the main frame. When the tricycle is assembled, at least a top support structure of the front frame is substantially transverse to the main frame. Furthermore, the front frame or portions of the front frame are movably and/or removably interconnected to the main frame, to allow the front frame or portions of the front frame to be positioned such that they are substantially parallel to the main frame for transport, for example by car. In particular, when so disassembled, a vehicle in accordance with embodiments of the present invention can be carried by a conventional trunk mounted bicycle carrier rack.

In accordance with additional aspects of the present invention, a steering assembly featuring a handlebar having an axis of rotation that is within an angle of from about 0 to about 45° to the plane of the ground is provided. This feature allows the rider to easily turn the handlebars through their entire range of motion. The handlebars turn both front wheels through a linkage mechanism. In accordance with embodiments of the present invention, the linkage mechanism can be disconnected and reconnected without requiring the use of tools, to facilitate transportation or storage of the vehicle. In accordance with other embodiments of the present invention, the linkage mechanism does not need to be disconnected when the vehicle is configured for transportation or storage.

Additional features and advantages of the present invention will become more readily apparent from the following description, particularly when considered in view of the accompanying drawings.

BRIEF DESCRIPTION OF THE DRAWINGS

FIG. 3A is a view of a vehicle in accordance with embodiments of the present invention that has been disassembled and attached to a rack for transportation by car;

FIG. 4 is an elevation of a vehicle in accordance with embodiments of the present invention, with the right front wheel and fork removed;

FIG. 6A is a top view of a steering mechanism in accordance with embodiments of the present invention;

FIG. 6B is a front view of the steering mechanism of FIG. 6A;

FIG. 8 is an illustration of a crankset carrier in accordance with embodiments of the present invention.

DETAILED DESCRIPTION

Figure 1A:
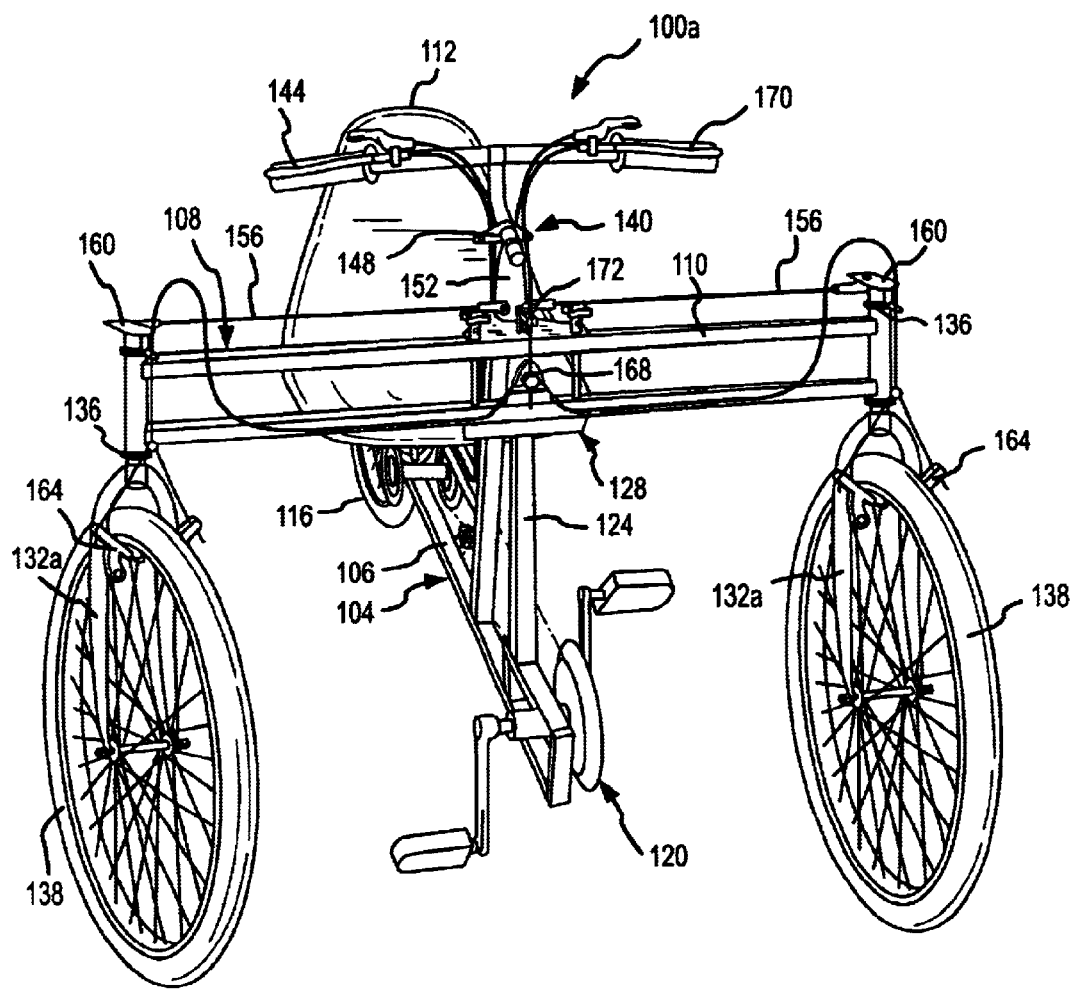
FIG. 1A is a front perspective view of a vehicle in accordance with embodiments of the present invention.
Figure 1B:
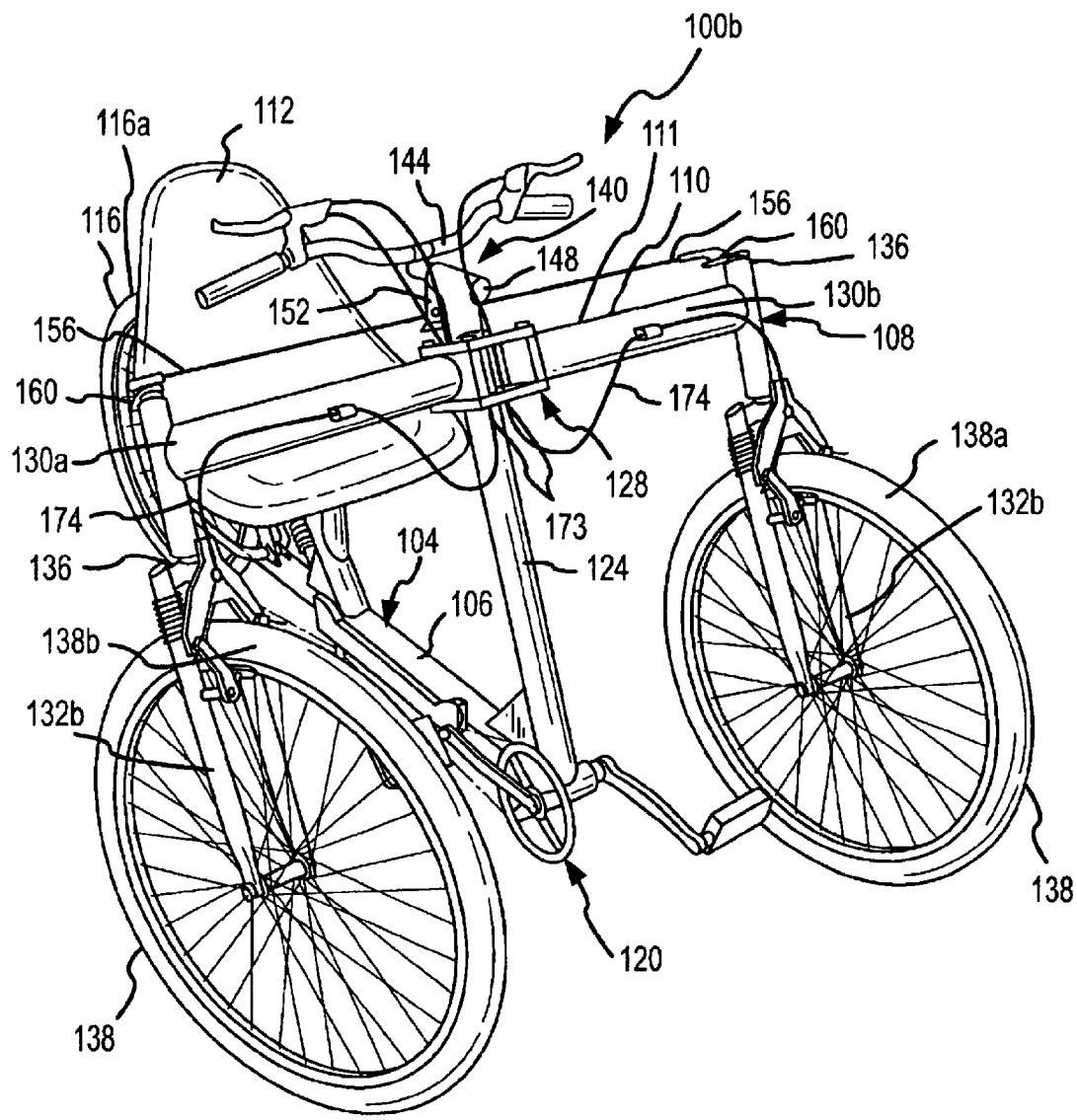
FIG. 1B is a front perspective view of a vehicle in accordance with other embodiments of the present invention.

With reference now to FIGS. 1A and 1B, vehicles 100a and b in accordance with embodiments of the present invention are shown in perspective views. As shown in the figures, a vehicle 100 may include a substantially longitudinal main frame 104, comprising at least one longitudinal member 106, interconnected to a front frame 108. Interconnected to the main frame are a seat 112 for supporting a human user or rider, a rear wheel 116, and a crank assembly 120. In addition, the main frame 104 includes a riser structure or portion 124.

The front frame 108 is interconnected to the main frame 104 by a fastening assembly 128. More particularly, the fastening assembly 128 may interconnect a top support structure 110 included as part of the front frame 108 to the riser portion 124 of the main frame 104 such that at least the top support structure 110 of the front frame 108 is substantially perpendicular to the longitudinal member 106 of the main frame 104 when the vehicle 100 is ready for use by a rider. In accordance with an embodiment of the present invention, the fastening assembly 128 can be operated without requiring the use of hand tools. Accordingly, the front frame 108 may be folded with respect to or disconnected from the main frame 104, for example for transportation of the vehicle 100 by another vehicle or for storage of the vehicle 100. More particularly, the fastening assembly 128a depicted in FIG. 1A permits the front frame 108a to be fixed to the main frame 104a so that the vehicle 100a is ready to be ridden, and permits the front frame 108a to be disconnected from the main frame for storage or transport of the vehicle. The fastening assembly 128b depicted in FIG. 1B permits a first arm 130a and a second arm 130b of the front frame 108b top support structure 110 to be locked in a position that is substantially transverse to the main frame 104b when the vehicle 100 is being ridden and permits the arms 130 of the top support structure 110b to be rotated about hinges when locking mechanisms associated with the fastening assembly are released or unlocked, so that the first and second arms 130 are substantially parallel to the main frame 104b, as described in greater detail elsewhere herein.

The front frame 104 includes a pair of wheel forks 132. According to an embodiment of the present invention, the wheel forks 132 are conventional bicycle forks. As shown in the embodiment depicted in FIG. 1B, the wheel forks 132b may comprise suspension forks to increase the comfort of the rider as compared to embodiments featuring a rigid fork 132a (as shown in FIG. 1A). The wheel forks 132 may be pivotally mounted to the front frame 108 using a conventional bicycle headset 136. A front wheel 138 is carried in each of the wheel forks 132.

A steering mechanism 140 for receiving steering control inputs from a rider generally includes handlebars 144 pivotally mounted to the riser 124 of the main frame 104 through a steering pivot 148. The steering pivot 148 may in turn be interconnected to a steerer or pivot plate 152. A pair of tie rods 156 are provided so that a tie rod 156 extends between the steerer plate 152 and a steering arm 160 fixed to each wheel fork 132.

Front wheel brakes 164 may be operated simultaneously through a central cable or straddle hanger 168. The central cable hanger 168 may be interconnected to a brake lever 170 mounted to the handlebar 144. In order to facilitate the removal of the front frame 108 from the main frame 104, embodiments such as illustrated in FIG. 1A may include a tensioning knob 172 that can be operated to relieve tension on the central cable hanger 168, so that the central cable hanger 168 can be disconnected from the individual front wheel brakes 164. In accordance with embodiments of the present invention, this operation can be completed by the hand of a user, without requiring the use of tools. In accordance with embodiments such as illustrated in FIG. 1B, cable housing stops 173 may be included as part of the fastening assembly 128, allowing flexible cable housings 174 to be used to route the front brake cables between the fastening assembly 128 and the front frame 108, eliminating the need to disconnect the central cable hanger 168 in order to fold the vehicle 100.

Figure 2A:
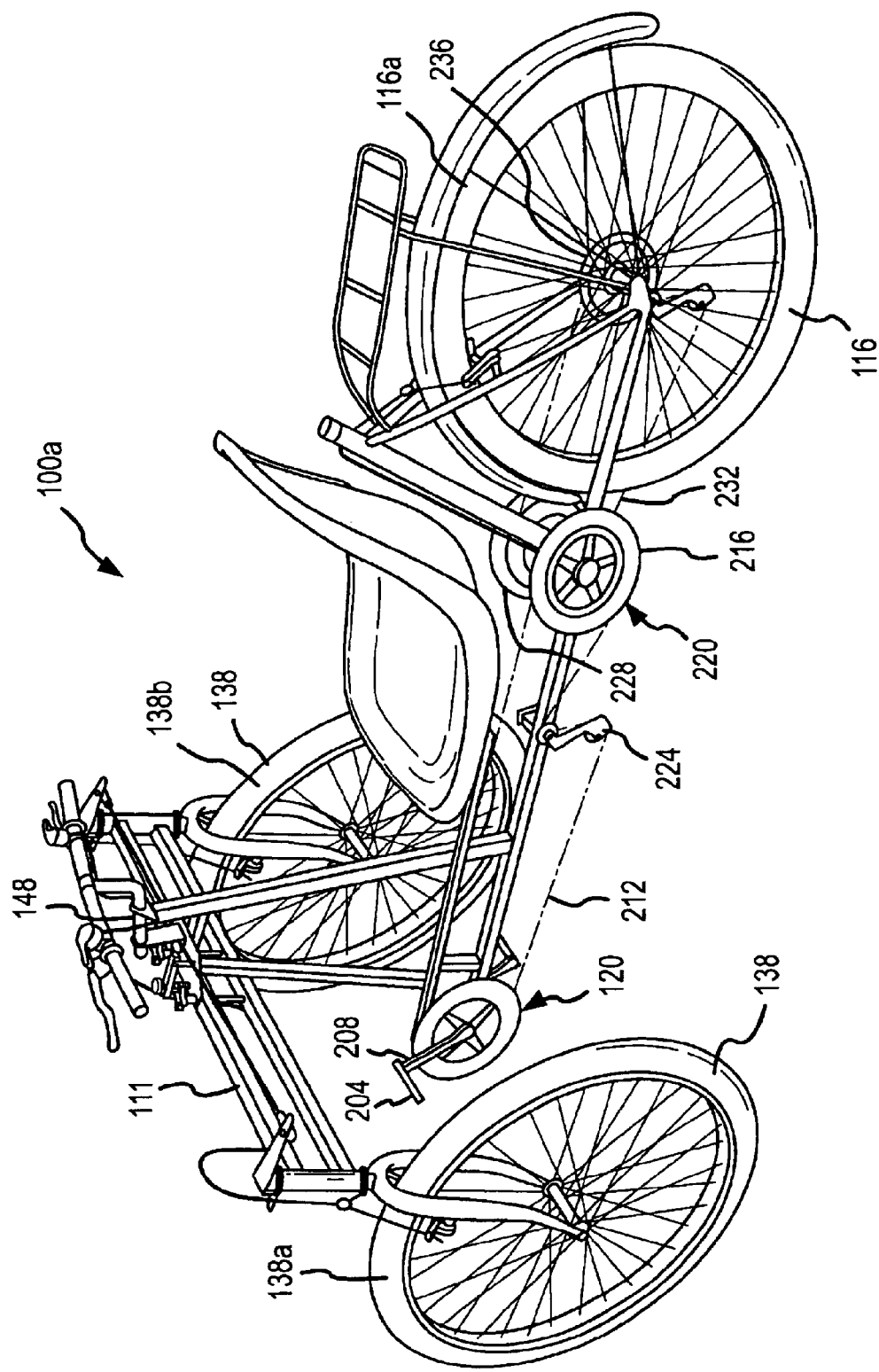
FIG. 2A is a rear perspective view of a vehicle in accordance with embodiments of the present invention.
Figure 2B:
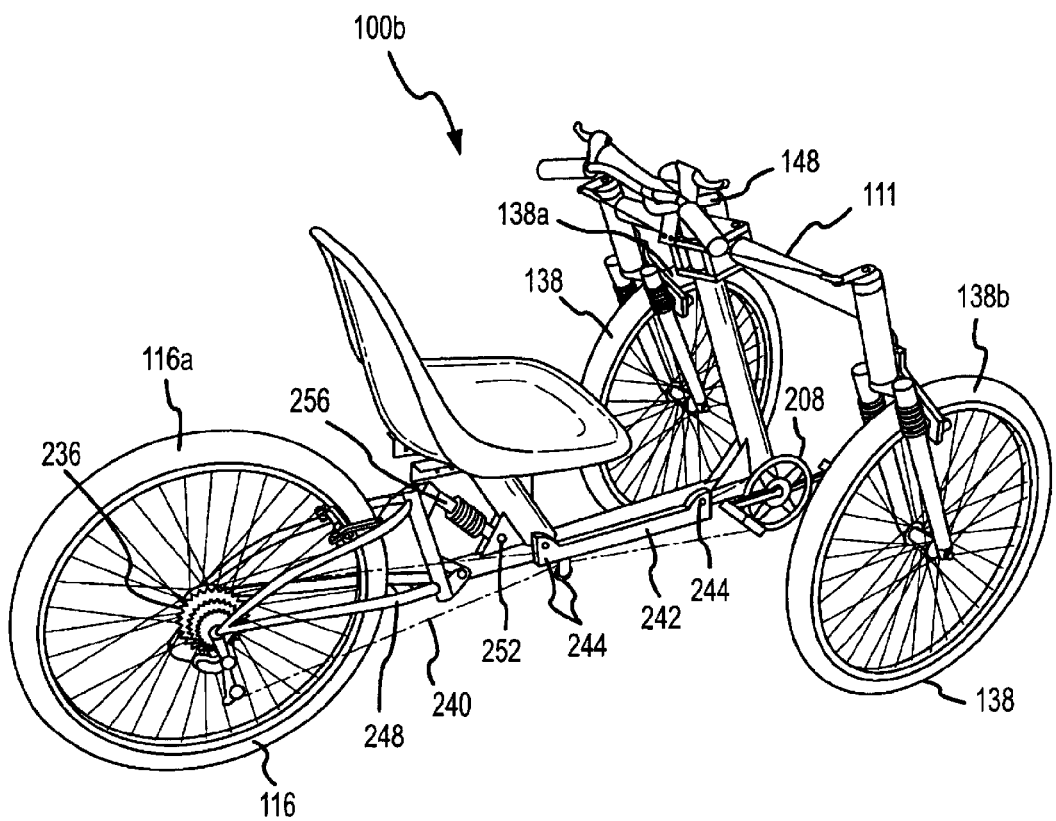
FIG. 2B is a rear perspective view of a vehicle in accordance with other embodiments of the present invention.

With reference now to FIGS. 2A and 2B, vehicles 100 in accordance with embodiments of the present invention are shown from a rear perspective view. As shown, the steering pivot 148 has an axis of rotation that is substantially parallel to the plane of the surface on which the vehicle 100 rests. In accordance with other embodiments of the present invention, the axis of rotation of the steering pivot 148 is at an angle to the plane of a road or other support surface on which the wheels 116, 138 of the vehicle 100 are resting of between 0 and 45°. In accordance with further embodiments of the present invention, the axis of rotation of the steering pivot 148 is at an angle of between about 1° and 20° from the plane of a support surface, with the rear of the steering pivot 148 farther from the plane of or through the support surface than the front of the steering pivot. As used herein, the plane of the support surface may be taken to mean the plane that is tangent to the bottom of all the wheels 116, 138, and therefore may correspond to the ground the vehicle 100 is resting on when it is being ridden. This configuration allows a rider to steer the vehicle 100 easily, even when making tight turning maneuvers. For purposes of the present invention, an angle is about equal to a stated angle if it is within ±2° of the stated angle.

The crank assembly 120 includes pedals 204, each of which are interconnected to the crank arms of a crankset 208. The crankset 208 may be a conventional bicycle crankset. With particular reference now to FIG. 2A, A forward drive chain 212 interconnects the crankset 208 to an input sprocket 216 of an intermediate or transfer gear set 220. Tension may be maintained in the forward drive chain 212 by a spring-loaded tension pulley mechanism 224.

The intermediate gear set 220 may include one or more output sprockets 228. The output sprockets 228 are driven by a spindle interconnecting the output sprockets 228 to the input sprocket 216. A rear drive chain 232 interconnects the output sprockets 228 to a freewheel 236 located on the hub of the rear wheel 116. The rear drive chain 232 may be selectively located on different output sprockets 228 or cogs of the freewheel 236 by conventional bicycle derailleurs, to provide user selectable gearing. Alternatively or in addition, user selectable gearing may be provided through the use of an internally geared hub. As yet another alternative, a single gear ratio may be provided.

With particular reference now to FIG. 2B, a single drive chain 240 may be used to interconnect the crankset 208 to a freewheel 236 on the hub of the rear wheel 116. The drive chain 240 may be selectively located on different chainwheels provided as part of the crankset 208 or cogs of the freewheel 236 by conventional bicycle derailleurs, to provide user selectable gearing. Alternatively or in addition, user selectable gearing may be provided through the use of an internally geared hub. As yet another alternative, a single gear ratio may be provided. A chain guide assembly 242 with one or more idler pulleys 244 may be provided to limit chain slap. A vehicle 100b in accordance with embodiments of the present invention may also feature a suspended rear wheel 116. Accordingly, in an exemplary embodiment, a swing arm 248 may be provided that is interconnected to the main frame 104 through a pivot point 252 and a spring/shock unit 256.

With reference now to FIG. 3A, a vehicle 100a in accordance with embodiments of the present invention is shown with the front frame 108 disconnected from the main frame 104. In particular, the front frame 108 and the main frame 104 have been positioned so that the top support structure 110 of the front frame 108 and the longitudinal member 106 of the main frame 104 are substantially parallel to one another, thereby providing a more compact package for transportation or storage of the vehicle 100. As used herein, substantially parallel may be taken to mean that at least portions of the referenced components lie in planes that are within about ±15 degrees of being parallel to one another. As shown in FIG. 3, by arranaging the front frame 108 and the main frame 104 so that they are substantially parallel to one another, the vehicle 100 can be loaded onto a conventional rack 304 mounted to the trunk of an automobile 308.

Figure 3B:
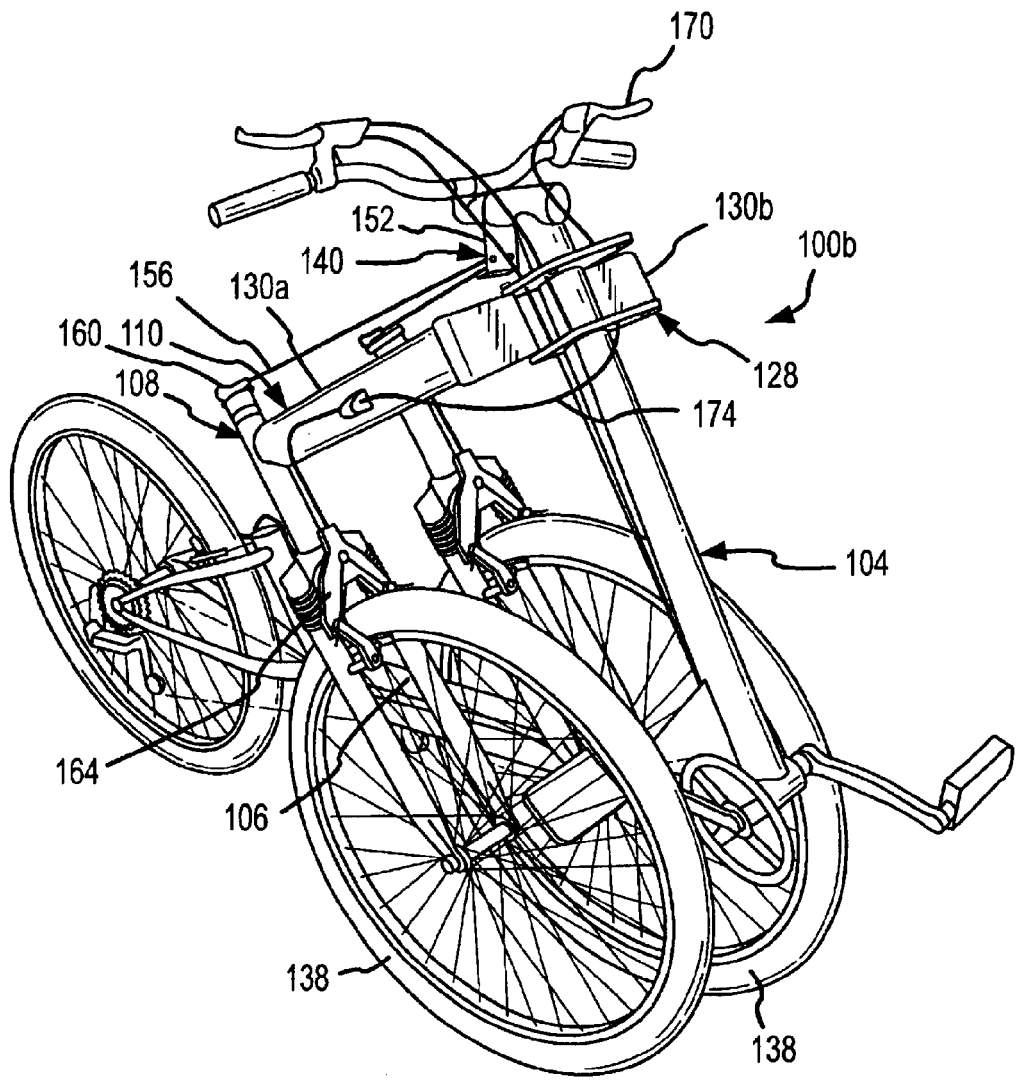
FIG. 3B is a front perspective view of the vehicle of FIGS. 1B and 2B in a folded condition.

With reference to FIG. 3B, a vehicle 100b in accordance with other embodiments of the present invention is shown, with the front frame 108 folded. In particular, the first arm 130a and the second arm 130b of the front frame 108 have been rotated about hinges provided as part of the fastening assembly 128, so that the arms 130 are substantially parallel to the main frame 104, for example at least when the vehicle 100 is viewed from above. With respect to such an embodiment, no pieces of the vehicle 100 are required to be disconnected from the rest of the vehicle 100. In addition, the front wheel brakes 164 can remain connected to the associated brake lever 170. In particular, movement between the first and second arms 130 of the front frame 108 relative to the fastening assembly 128 is accommodated by the flexible cable housings 174. In addition, it can be appreciated that the steering mechanism 140 does not need to be disconnected in order to fold the arms 130 of the front frame 108 in such an embodiment. In particular, it can be appreciated that each arm 130 and tie rod 156 pair, together with the steerer plate 152 and the associated steering arm 160, form a parallelogram such that the tie rod 156 folds with its associated arm. Furthermore, it can be appreciated that as an arm 130 and associated tie rod 156 are folded, the orientation of the associated front wheel 138 remain about the same. That is, if the front wheels 138 are substantially parallel to the main frame 104 before folding the arms 130, the wheel will remain substantially parallel to the main from 104 after folding the arms 130. Furthermore, embodiments of the present invention allow the front wheels 138 to be steered using control inputs provided through the handlebars 144, even while the vehicle 100 is folded.

With reference now to FIG. 4, a vehicle 100 in accordance with embodiments of the present invention is shown in a side elevation, with the right front wheel 138 removed. As seen in FIG. 4, the main frame 104 is relatively low to the ground, facilitating a low center of gravity.

The main frame 104 may include a crankset carrier 404. The crankset carrier 404 allows the position of the crankset 208 to be altered, to help accommodate riders of different sizes. Alternatively, the crankset 208 may be carried by a fixed bottom bracket tube or shell. Furthermore, it can be seen that embodiments of the present invention locate the crankset 208 substantially between the front wheels 138. In accordance with further embodiments, the position of the seat 112 can be altered to change the relationship of the seat 112 to the handlebars 144 and the crankset 208, again to accommodate riders of different sizes. In accordance with embodiments of the present invention, the seat 112 can be removed without requiring the use of tools, to facilitate storage and/or transportation of the vehicle 100.

Figure 5:
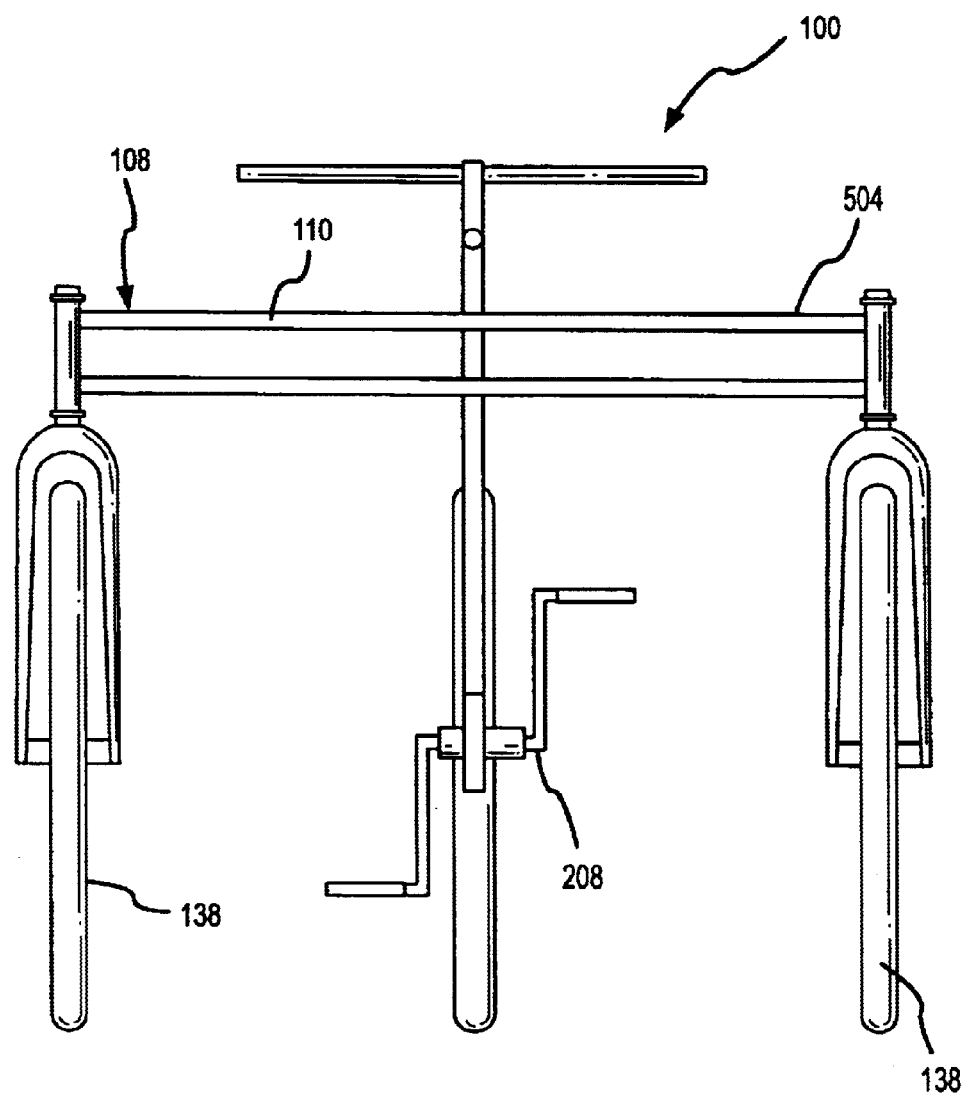
FIG. 5 is a front elevation of a vehicle in accordance with embodiments of the present invention.

With reference now to FIG. 5, a vehicle 100 in accordance with embodiments of the present invention is shown in a front elevation. FIG. 5 illustrates the relatively wide and therefore stable stance provided by embodiments of the present invention. In addition, FIG. 5 illustrates how embodiments of the present invention provide a front frame 108 with a top support structure 110 to allow conventional bicycle forks 132 to be used to locate the front wheels 138, while maintaining a relatively low center of gravity. Furthermore, it can again be seen that embodiments of the present invention locate the crankset 208 substantially between the front wheels 138. In addition, the crankset 208 may be located so that it is lower than the top of the front wheels 138. In accordance with still other embodiments of the present invention, the spindle of the crankset 208 may be about the same distance (i.e., within about ±1 inch) from the ground as the hubs of the front wheels 138. Also, it can be seen that a top surface 504 of the top support structure 110 is above the front wheels 138.

With reference now to FIG. 6A, details of a steering mechanism 140a, for use in connection with a vehicle 100 in accordance with embodiments of the present invention are shown from a top view. Details of the steering mechanism 140 are shown in FIG. 6B from a front view. As seen in FIGS. 6A and 6B, the handlebars 144 are interconnected to a steerer or pivot plate 152 through or about the steering pivot 148. The steerer plate 152 provides mounting points for a pair of tie rods 156. Each tie rod 156 is interconnected to a steering arm 160 at an end of each tie rod 156 opposite the steerer plate 152. Ball joints 608 may be provided at the ends of the tie rods 156 to interconnect them to the pivot plate 152 and steering arms 160 and to allow relatively free and unrestricted movement of the tie rods 156 relative to the steerer plate 152 and the steering arms 160. In accordance with embodiments of the present invention, hand operable fasteners allow components of the steering mechanism 140 to be disconnected from one another, to facilitate the removal of the front frame from the main frame 104. For example, wing nuts or knobs 612 may be provided to allow the tie rods 156 to be disconnected from the steerer plate 152, without requiring the use of tools. Alternatively, in accordance with further embodiments of the present invention and as described elsewhere herein, the arms 130 of the front frame 108 can be folded without requiring disassembly of the steering mechanism 140.

Figure 7A:
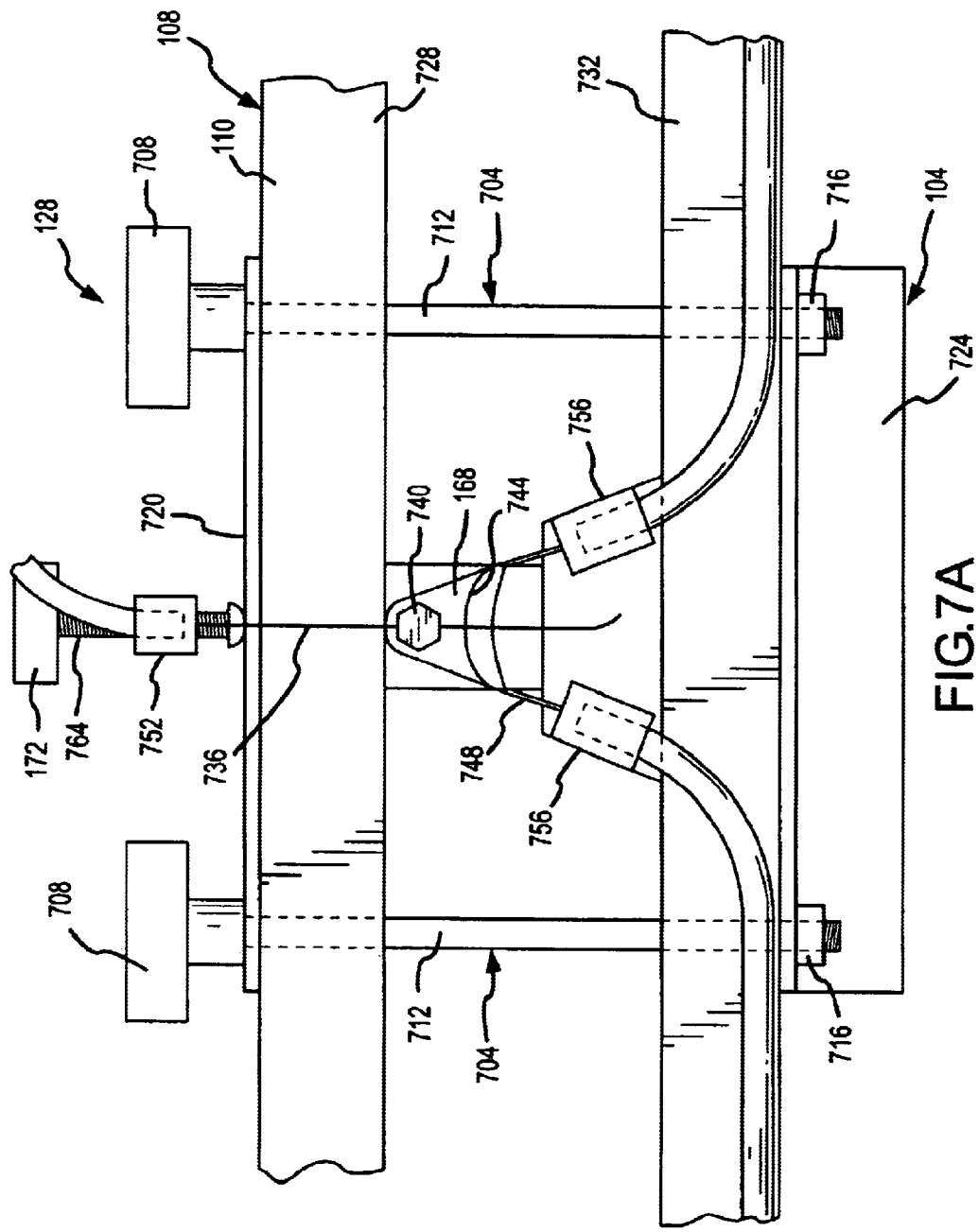
FIG. 7A is an illustration of a fastening assembly and cable arrangement in accordance with embodiments of the present invention.

With reference now to FIG. 7A, a fastening assembly 128 in accordance with embodiments of the present invention is illustrated. As seen in FIG. 7A, the fastening assembly 128 may include one or more fastening subassemblies 704. The fastening subassemblies 704 maintain the position of the main frame 104 relative to the front frame 108 when the vehicle 100 is in an assembled state. Furthermore, the fastening subassemblies 704 can be operated without requiring the use of tools to allow the front frame 108 to be removed or disconnected from the main frame 104. For example, as shown in FIG. 7A, hand operable knobs 708 may be threaded to bolts 712 that pass through holes formed in the main frame 104 and front frame 108. The bolts 712 may be threaded into nuts 716 fixed to the main frame 104. As can be appreciated by one of skill in the art, by providing a mechanical interconnection between the main frame 104 and the front frame 108 that is suitably configured, forces on the fastening assembly 128 when the vehicle 100 is in an assembled state can be kept relatively low. For example, as shown in FIG. 7A, the main frame 104 may provide top 720 and bottom 724 brackets or fixtures separated from one another by a distance that is substantially equal to the distance between a top rail 728 and bottom rail 732 of the front frame 108 top support structure 110. Accordingly, the relationship between the main frame 104 and the front frame 108 in a vertical direction can be precisely and reliably determined and maintained. In addition, the relationship between the main frame 104 and the front frame 108 from side to side can be determined by the position of the holes through which the bolts 712 are passed. Accordingly, forces in a side-to-side direction can be borne mainly by the bolts 712, and the knobs 708 or other hand operable fasteners need not be required to resist large forces when the vehicle 100 is in normal operation.

Also illustrated in FIG. 7A (and in FIG. 7B) is the central cable hanger 168. The cable hanger 168 is interconnected to the brake lever 170 by a primary brake cable 736 via a fastener 740. The hanger portion 744 of the cable hanger 168 carries a secondary brake cable 748 at a center portion of the secondary brake cable 748. The secondary brake cable 748 is interconnected to a first front wheel brake 164 at or towards a first end of the cable 748, and the secondary brake cable 748 is interconnected to a second wheel brake 164 at or towards a second end of the cable 748. This configuration allows a single brake lever 170 to apply equal braking force to each front wheel.

In addition, the brake actuation arrangement shown in FIG. 7A facilitates the disassembly of the vehicle 100. In particular, by de-tensioning the brake cables 736 and 748, the secondary brake cable 748 can be disconnected from the straddle hanger 168 without requiring the use of tools. In order to de-tension the brake cables 736 and 748, a traveling brake cable housing stop 752 may be moved closer to stationary brake cable housing stops 756. For example, as illustrated in FIG. 7A, a tensioning knob 172 fixed to a threaded rod or bolt 764 may be turned to alter the distance between the traveling brake cable housing stop 752 and the stationary cable housing stops 756.

Figure 7B:
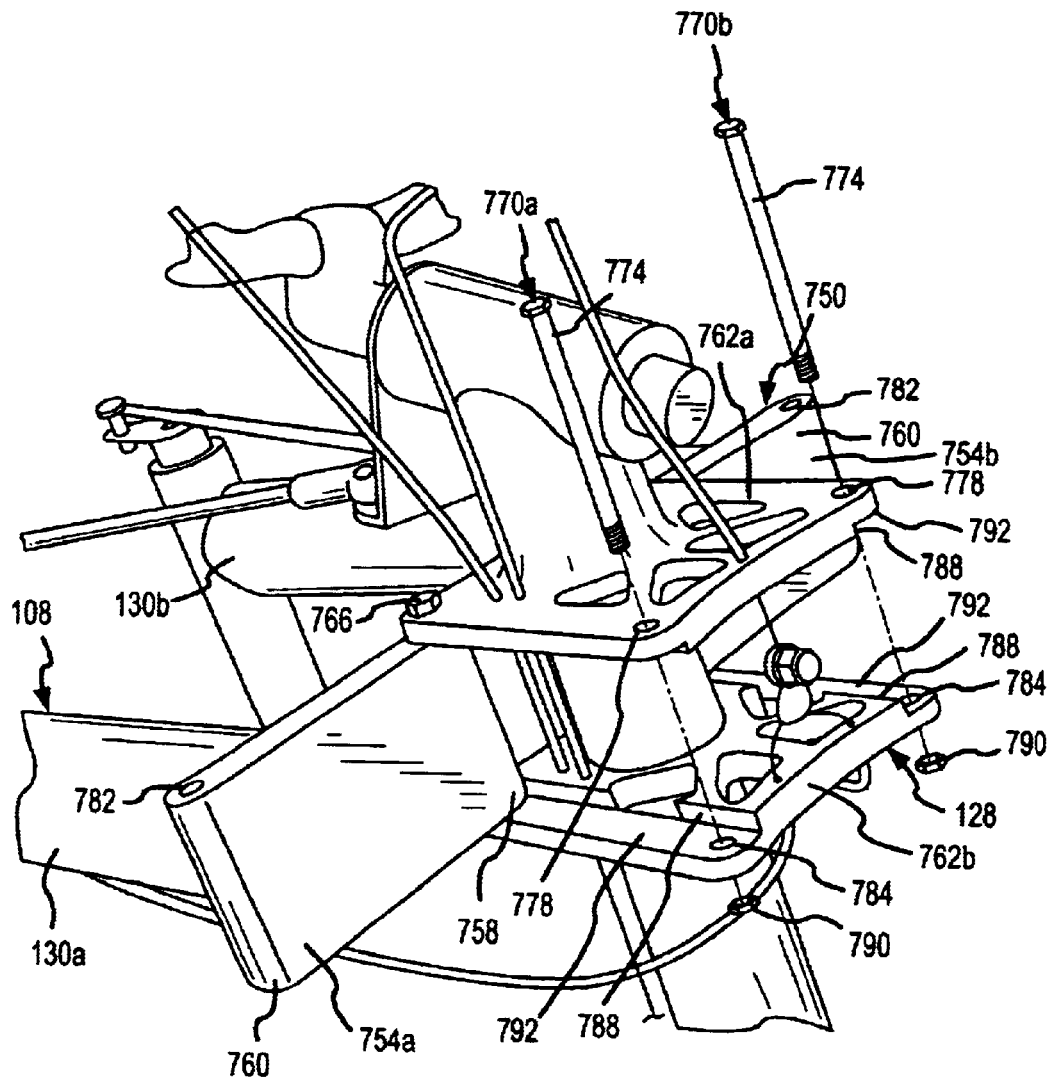
FIG. 7B is a perspective view of a fastening assembly and cable arrangement in accordance with other embodiments of the present invention.

With reference now FIG. 7B, a fastening assembly 128 in accordance with other embodiments of the present invention is illustrated. In particular, the fastening assembly 128 is shown with the arms 130 of the front frame 108 folded so that they are substantially parallel to the main frame 104. Accordingly, the fastening assembly 128 depicted in FIG. 7B comprises a folding assembly 750. In general, the folding assembly 750 includes first 754a and second 754b connector plates that are fixed to the first 130a and second 130b arms of the front frame 108 respectively. Each connector plate 754 includes a hinged end 758 and a fixable end 760. The connector plates 754 are interconnected to first 762a and second 762b fixed plates of the folding assembly 750 by hinge pins 766. The fixed plates 762 may feature shoulders 788 that cooperate with connector plate flanges 792 to assist in locating the connector plates 754 when locked in an operating position by the locking assemblies 770.

In addition, embodiments of a fastening assembly 128 comprising a folding assembly 750 may include first 770a and second 770b locking assemblies. In general, when the front frame 108 is folded, the locking assemblies 770 are released to allow the connector plates 754 to pivot about the binge pins 766. Alternatively, when the vehicle 100 is in use, the locking assemblies 770 hold the connector plates 754 so that they are unable to rotate about the hinge pins 766. In accordance with embodiments of the present invention, and as illustrated in FIG. 7B, the locking assemblies 770 may each comprise a bolt 774 that can be received through a hole 778 in the first fixed plate 762a. Each bolt 774 may pass through a bore 782 in the fixable end 760 of the connector plate 754, and into or through a receiving hole 784 in the second fixed plate 762b. The fixing member 774 may be fixed so that it maintains the connector plate 754 in a fixed position relative to the fixing plates 762 by being threaded into the receiving hole 784 itself, by passing through the receiving hole 784 and being interconnected to a threaded fastener 790, such as a nut or a hand operated member, such as a knob or wing nut. Alternatively or in addition, the fixing member 774 may itself comprise a threaded bolt and may include a hand operable knob. As can be appreciated by one of skill in the art after consideration of the description provided herein, the locking assemblies 770 may alternatively comprise other structures capable of preventing a connecting plate 754 from rotating about the hinged end 758 when the vehicle 100 is in use. For example, locking assemblies 770 may comprise latches, spring loaded latches, cam type quick release levers or cotter pins.

With reference now to FIG. 8, a crankset carrier 404 in accordance with embodiments of the present invention is illustrated. As shown in FIG. 8, the crankset carrier 404 may include substantially parallel rail members 804 and 808. One or both of the rail members 804, 808 may be integral to longitudinal members 106 of the main frame 104, or may be interconnected to the main frame 104. For example, as most easily seen in FIG. 4, the lower rail 804 may comprise an extension of a longitudinal member 106 comprising a bottom tube of the main frame 104. The crankset carrier 404 additionally includes an adjustable bottom bracket 812. The position of the bottom bracket 812 along the rails 804, 808 of the crankset carrier 404 can be altered by turning a screw or bolt 816. In particular, the bolt 816 is interconnected to a threaded hole or holes provided as part of the bottom bracket 812. Alternatively or in addition, fixing bolts 820 may be provided to clamp the bottom bracket 812 in a selected position along the rails 804, 808.

As can be appreciated by one of skill in the art, various materials may be selected in the construction of a vehicle 100 in accordance with embodiments of the present invention. For example, square and/or round section tubing may be selected in the construction of the main frame 104 and front frame 108. Where appropriate, plates or angled members may also be used. Such tubes and members may be formed from steel, including mild steel or chrome molybdenum, aluminum alloys, titanium, magnesium or other metals. Alternatively, composite materials or plastics may be used.

As a nonlimiting example, a vehicle 100 in accordance with the present invention was constructed from round and square section chrome molybdenum tubing and plate, and welded and/or bolted together. The front wheel forks 132 were conventional bicycle forks, and were mounted to the front frame 108 using conventional bicycle headsets 136. The front 138 and rear 116 wheels were standard spoked bicycle wheels. The steering mechanism 140 included tie rods 156 formed from partially threaded rod stock, with commercially available ball joints 608 at both ends. The steering pivot 148 was formed from steel rod and plate, and rotatably interconnected to the riser 124 of the main frame 104 using a conventional bicycle headset. Conventional handlebars 144 and brake levers 170 were used.

The front crankset 120 was a conventional bicycle crankset with arms reversed such that the drive train was on the left side of the main frame 104. The crankset 120 was carried by a conventional bicycle bottom bracket bearing set held in a bottom bracket shell provided as part of the bottom bracket 812. The intermediate crankset 216 included sprockets from bicycle cranksets on either side of the frame 104. Gearing was provided using conventional bicycle derailleurs controlled by levers mounted to the handlebars 144.

Continuing the foregoing example, the wheel base was about 50 inches, the length about 76 inches, and the total width about 42 inches. The front wheel track was about 37 inches, and 26 inch wheels were used. The seat was positioned about 21½ inches from the ground. This configuration was found to provide good control even at speeds up to about 20 mph. The crankset carrier 404 provided about 5½ inches of adjustment, and the seat about 3 inches of adjustment, from front to rear.

As another non-limiting example, vehicle 100 in accordance with the present invention was constructed from elliptical section aluminum alloy tubing and aluminum alloy plate, welded and/or bolted together. The front wheel forks 132 were conventional suspension bicycle forks and were mounted to the front frame 108 using conventional bicycle headsets 136. In addition, the rear wheel 116 was mounted to a swing arm interconnected to the main frame 104 through a pivot point and a spring/shock unit. Accordingly, a vehicle 100 may comprise a tricycle having all three wheels suspended using spring and shock units that are separately provided and/or integrated into forks or other components to provide a more comfortable ride. The wheels had a diameter of 20 inches, facilitating a compact design.

Continuing this second example, the front crankset 120 was a conventional bicycle crankset mounted into a conventional bicycle bottom bracket bearing set held in a bottom bracket shell. Furthermore, a single drive train was used to transmit drive force from the crankset 120 to the sprocket of the rear wheel 116. Variable gearing was provided using conventional bicycle derailleurs. The seat 112 can be moved along a track to a selected position by operating a spring loaded latch. Also, the seat 112 can be completely removed for transport.

As can be appreciated by one of skill in the art after consideration of the description provided herein, it can be appreciated that various dimensions of a vehicle 100 may be selected in order to accommodate riders within particular size ranges, and/or different uses or applications of a vehicle 100. Furthermore, although various embodiments have depicted vehicles 100 comprising tricycles, the present invention is not so limited. For instance, four-wheeled vehicles may be provided. In accordance with a four-wheeled vehicle 100, the rear wheels may be interconnected to the main frame through an arm or arms that can be disconnected or moved with respect to the main frame to facilitate storage or transportation of the vehicle.

Although certain examples of a vehicle 100 in accordance with embodiments of the present invention have been given in the context of a vehicle 100 sized for adults, it should be appreciated that the present invention is not so limited. In particular, a vehicle in accordance with the present invention sized for children may be provided. In addition, the present invention is not limited to vehicles powered by the legs of a user. For example, motors or hand-operated cranks may be used instead of or in addition to leg powered cranks.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention in such or in other embodiments and with various modifications required by their particular application or use of the invention. It is intended that the appended claims be construed to include the alternative embodiments to the extent permitted by the prior art.

What is claimed is:

1. A vehicle apparatus, comprising:
    a main frame, including;
        at least a first longitudinal member;
        a riser structure; and
    a rear wheel rotatably interconnected to said main frame;
    a front frame removably interconnected to said main frame, including:
        a top support structure;
        a pair of wheel forks pivotally mounted to said top support structure;
        a pair of front wheels, wherein one of said front wheels is rotatably interconnected to each of said wheel forks, wherein at least said top support structure of said front frame includes a top surface that is above plane tangent to a top surface of said front wheels and said rear wheel, and wherein substantially all of said at least a first longitudinal member of said main frame is below a top of said wheels; and
        a steering arm interconnected to each of said wheel forks;
    a steering mechanism interconnected to said front frame, including:
        a steering pivot;
        a handlebar interconnected to said steering pivot; and
        a pair of tie rods, wherein each tie rod is interconnected to said steering pivot at a first end and to one of said steering arms at a second end.

2. The apparatus of claim 1, further comprising a fastening assembly wherein said top support structure includes a first arm and a second arm, and wherein said first arm and said second arm of said top support structure are interconnected to one another and to said main frame riser structure by said fastening assembly.

3. The apparatus of claim 2, wherein in a first state of said fastening assembly said first arm and said second arm are extended so that the arms are substantially perpendicular to said longitudinal member of said main frame, and wherein in a second state of said fastening assembly said first arm and said second arm are folded.

4. The apparatus of claim 3, wherein said fastening assembly includes first and second locking assemblies, wherein when said fastening assembly is in said first state said locking assemblies are in a locked state, and wherein when said fastening assembly is in said second state said locking assemblies are in an unlocked state.

5. The apparatus of claim 1, further comprising a fastening assembly wherein said fastening assembly includes a first hinge interconnected to said first arm and a second hinge interconnected to said second arm, wherein said first and second arms may be rotated about said first and second hinges respectively when said fastening assembly is in a first state.

6. The apparatus of claim 5, wherein a position of said first arm with respect to said main frame and a position of said second arm with respect to said main frame are fixed when said fastening assembly is in a second state.

7. The apparatus of claim 5, wherein said fastening assembly comprises at least a first locking assembly, wherein said fastening assembly is in said first state when said at least a first locking assembly is unlocked.

8. The apparatus of claim 7, wherein a position of said first arm with respect to said main frame and a position of said second arm with respect to said main frame are fixed when said at least a first locking assembly is locked.

9. The apparatus of claim 1, further comprising:
    a crank assembly mounted to said main frame and located substantially between said pair of front wheels.

10. The apparatus of claim 1, wherein said steering pivot has an axis of rotation that is at an angle of between 0 and 45 degrees to a plane defined by a bottom surface of said rear wheel and bottom surfaces of said front wheels, wherein said handlebar rotates about said axis.

11. The apparatus of claim 1, further comprising:
a fastening assembly, wherein said front frame is removably interconnected to said main frame by said at least a first fastening assembly.

12. The apparatus of claim 11, wherein said at least a first fastening assembly is operable by hand and without a need for tools.

13. The apparatus of claim 1, further comprising:
a brake lever;
a cable hanger interconnects to said brake lever by primary brake cable;
a secondary brake cable carried by said cable hanger; and
a pair of front brakes, wherein said second brake cable is interconnected to a first of said front brakes at or towards a first end and as interconnected to a second of said front brakes at or towards a second end.

14. A method for providing a foldable human powered vehicle, comprising:
interconnecting a front frame to a main frame with at least a first fastening assembly, wherein said first fastening assembly has at least first and second states, wherein in said first state a location of a top support structure of said front frame is substantially fixed with respect to said main frame, and wherein said at least a first fastening assembly is in said first state when said vehicle is in an operating condition;
operating said first fastening assembly to place said at least a first fastening assembly in a second folded state, wherein a position of said top support structure of said front frame may be moved with respect to said main frame; and
after said placing said first fastening assembly in said second state, positioning said top support structure of said front frame such that front wheels interconnected to said frame are closer to said main frame than when said vehicle is in said operating condition.

15. The method of claim 14, further comprising:
transporting said vehicle after said positioning said top support structure of said front frame such that front wheels interconnected to said frame are closer to said main frame than when said vehicle is in said operating condition.

16. The method of claim 14, further comprising:
turning said front wheels such that the wheels are substantially parallel to said main member of said front frame.

17. The method of claim 16, wherein said turning said front wheels is performed simultaneously with said positioning said top support structure of said frame such that front wheels interconnected to said frame are closer to said main frame than when said vehicle is in said operating condition.

18. A human powered vehicle, comprising:
means for supporting a human;
main frame means for carrying at least a first rear wheel and said means for supporting a human;
front frame means, including;
first means for pivotally carrying a first steerable wheel;
second means for pivotally carrying a second steerable wheel;
top support structure means, wherein at least one surface of said top support structure means is above a top surface of said first and second steerable wheels when said first and second steerable wheels and said at least a first rear wheel are on a road surface; (and)
fastening assembly means having vertical axis for interconnecting said front game means to said main frame means, including means for selectively fixing a position of said front frame means with respect to said main frame means; and
means for controlling a steering angle of said first and second steerable wheels, including means for receiving control input, wherein said means for receiving control input is at an angle of from about 0 to about 45 degrees with respect to said road surface when said wheels are supported by said road surface.

19. The apparatus of claim 18, wherein said means for selectively fixing a position of said front frame includes means for locking, wherein when said means for locking are in a locked state said position of said front frame means is fixed with respect to said main frame means.

* * * * *

UNITED STATES PATENT AND TRADEMARK OFFICE
CERTIFICATE OF CORRECTION

PATENT NO. : 6,953,203 B2
DATED : October 11, 2005
INVENTOR(S) : Wilcox et al.

It is certified that error appears in the above-identified patent and that said Letters Patent is hereby corrected as shown below:

Column 3,
Line 37, add the following after "wheel forks 132." -- As shown in Figs. 1B, 2A and 2B, the top support elements 110 may include a top surface 111 that is above a plane tangent to a top surface 138a, 138b, 116a of the front 138 and rear 116 wheels. --.

Column 11,
Line 30, delete "a second folded" insert -- said second --.

Column 12,
Line 2, delete "the" insert -- said front --.
Line 24, delete "fastening assembly" and "having vertical axis".
Line 25, delete "game" insert -- frame --.
Line 31, after "wherein" insert -- an axis of rotation of --.

Signed and Sealed this

Twentieth Day of December, 2005

JON W. DUDAS
*Director of the United States Patent and Trademark Office*